(12) United States Patent
Bresser

(10) Patent No.: US 10,661,770 B2
(45) Date of Patent: May 26, 2020

(54) CONTROL DEVICE AND METHOD FOR OPERATING A HYDRAULIC BRAKE SYSTEM OF A VEHICLE

(71) Applicant: Robert Bosch GmbH, Stuttgart (DE)

(72) Inventor: Andreas Bresser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 15/980,240

(22) Filed: May 15, 2018

(65) Prior Publication Data

US 2018/0334154 A1  Nov. 22, 2018

(30) Foreign Application Priority Data

May 18, 2017 (DE) .................. 10 2017 208 374

(51) Int. Cl.

| | |
|---|---|
| *B60T 8/46* | (2006.01) |
| *B60T 7/04* | (2006.01) |
| *B60T 8/32* | (2006.01) |
| *B60T 8/17* | (2006.01) |
| *B60T 13/14* | (2006.01) |
| *B60T 13/74* | (2006.01) |
| *B60T 13/66* | (2006.01) |
| *B60T 13/68* | (2006.01) |
| *B60T 8/40* | (2006.01) |

(52) U.S. Cl.
CPC .............. *B60T 8/46* (2013.01); *B60T 7/042* (2013.01); *B60T 8/17* (2013.01); *B60T 8/321* (2013.01); *B60T 13/146* (2013.01); *B60T 13/662* (2013.01); *B60T 13/686* (2013.01); *B60T 13/745* (2013.01); *B60T 8/4081* (2013.01); *B60T 2201/03* (2013.01); *B60T 2220/04* (2013.01)

(58) Field of Classification Search
CPC . B60T 7/042; B60T 8/14; B60T 8/321; B60T 8/146; B60T 8/46; B60T 8/4081; B60T 13/686; B60T 13/745; B60T 2201/03; B60T 2220/04; B60T 13/18
See application file for complete search history.

(56) References Cited

U.S. PATENT DOCUMENTS

| | | | |
|---|---|---|---|
| 6,913,326 B1 * | 7/2005 | Ohkubo ................. | B60T 7/122 303/11 |
| 9,545,906 B2 * | 1/2017 | Zimmermann ........... | B60T 7/22 |
| 10,377,361 B2 * | 8/2019 | Blattert ................... | B60T 8/321 |

FOREIGN PATENT DOCUMENTS

DE   102014215379 A1   2/2016

* cited by examiner

*Primary Examiner* — Thomas W Irvin
(74) *Attorney, Agent, or Firm* — Norton Rose Fulbright US LLP; Gerard Messina

(57) ABSTRACT

A control device for a hydraulic brake system of a vehicle; as a reaction to a supplied warning signal as to a probable, early request for braking, the control device being configured to force at least one wheel exhaust valve of the hydraulic brake system into an open position in an undelayed or delayed manner and to activate a motor of a motorized hydraulic device of the hydraulic brake system; and as a reaction to a supplied brake setpoint signal as to requested braking with a current, setpoint deceleration not equal to zero, the control device being configured to force the at least one wheel exhaust valve into a closed position and to control the motor according to the setpoint deceleration currently requested. The present invention also relates to a hydraulic brake system for a vehicle and to a method for operating a hydraulic brake system of a vehicle.

10 Claims, 3 Drawing Sheets

CONTROL DEVICE AND METHOD FOR OPERATING A HYDRAULIC BRAKE SYSTEM OF A VEHICLE

RELATED APPLICATION INFORMATION

The present application claims priority to and the benefit of German patent application no. 10 2017 208 374.3, which was filed in Germany on May 18, 2017, the disclosure which is incorporated herein by reference.

FIELD OF THE INVENTION

The present invention relates to a control device for a hydraulic brake system of a vehicle. The present invention also relates to a hydraulic brake system for a vehicle. Furthermore, the present invention relates to a method for operating a hydraulic brake system of a vehicle.

BACKGROUND INFORMATION

In order to build up brake pressure autonomously or to increase brake pressure, it is known from the related art, that brake fluid may be transferred to at least one wheel brake cylinder of a hydraulic brake system with the aid of a motorized hydraulic device, such as the motorized piston-cylinder device discussed in DE 10 2014 215 379 A1.

SUMMARY OF THE INVENTION

The present invention provides a control device for a hydraulic brake system of a vehicle, having the features described herein, a hydraulic brake system for a vehicle, having the features described herein, and a method for operating a hydraulic brake system of a vehicle, having the features described herein.

The present invention provides options for "temporarily storing" electrical energy as rotational energy of a motor of a motorized hydraulic device used for autonomously building up brake pressure or for boosting brake pressure. In this manner, an output capacity of the motor of the motorized hydraulic device may be increased during subsequent braking of a vehicle. With the aid of the present invention, pressure build-up times for producing a desired brake pressure in at least one wheel brake cylinder interacting with the motorized hydraulic device, as well as a stopping distance of the vehicle, may also be reduced.

Consequently, the present invention contributes to increasing ride comfort and improving driving safety.

Due to the present invention's "temporary storage" of electrical energy as rotational energy of the motor of the motorized hydraulic device already prior to braking, less energy must be provided during subsequent braking, in order to overcome a rotor inertia of the motor. Therefore, a need for electrical energy, which must be provided during subsequent braking and extracted from an energy store integral to the vehicle (such as a vehicle electrical system or a vehicle battery), is also reduced. Thus, the present invention may also be used to reduce demands on the energy source integral to the vehicle (e.g., the vehicle electrical system or the vehicle battery).

The present invention is particularly suited to situations, in which, while driving a vehicle, it is apparent (for example, due to external events) that a rapid pressure build-up in at least one wheel brake cylinder of the vehicle will soon be needed/desired. Therefore, the present invention may implement, in particular, emergency and/or panic braking more rapidly.

However, it should be noted that a usability of the present invention is not limited to emergency and/or panic braking.

In one advantageous specific embodiment of the control device, as a reaction to the supplied warning signal, the electronic device is configured to force the at least one wheel exhaust valve into the open position, delayed by a fixedly predefined, elapsed delay time or by a delay time elapsing until the reaching of a brake pressure necessary to close an air gap of the at least one wheel brake cylinder. Thus, the specific embodiment of the control device described here provides not only the advantageous "temporary storage" of electrical energy as rotational energy of the motor of the motorized hydraulic device, but also the precharging of the at least one wheel brake cylinder to close its air gap already prior to the probable braking.

For example, a motor of a piston-cylinder device, in the form of a motor of the motorized hydraulic device, may be activated as a reaction to the supplied warning signal and controlled as a reaction to the supplied brake setpoint signal, in accordance with the setpoint deceleration currently requested.

Alternatively, or in addition, with the aid of the control device, a motor of at least one pump, in the form of a motor of the motorized hydraulic device, may also be activated as a reaction to the supplied warning signal and controlled as a reaction to the supplied brake setpoint signal, in accordance with the setpoint deceleration currently requested. In both cases, a vehicle component already present may be used for implementing the present invention. Consequently, in the case of many hydraulic brake systems, use of the present invention does not require any further development of the respective hydraulic brake system, using a new/additional motorized hydraulic device.

The advantages described above are also ensured in the case of a hydraulic brake system for a vehicle, including such a control device, the motorized hydraulic device, the at least one wheel brake cylinder and the at least one wheel exhaust valve. As a further refinement, the hydraulic brake system may even include additional brake system components.

In one advantageous further refinement of the hydraulic brake system, the at least one wheel brake cylinder is connected to a low-pressure storage chamber via the at least one wheel exhaust valve; an operating pressure of the low-pressure storage chamber being greater than or equal to a brake pressure necessary to close an air gap of the at least one wheel brake cylinder. Therefore, the specific embodiment of the hydraulic brake system described here is structurally configured in such a manner, that the air gap of the at least one wheel brake cylinder is closed already prior to the start of braking. Thus, as of the start of braking, brake fluid filled into the at least one wheel brake cylinder contributes immediately to raising the brake force in the at least one wheel brake cylinder, and therefore to increasing a braking action of the at least one wheel brake cylinder.

In each instance, the at least one wheel brake cylinder may be a low-drag wheel brake cylinder. Since many specific embodiments of the hydraulic brake system cause the air gap of the at least one wheel brake cylinder to be closed already prior to the start of braking, low-drag wheel brake cylinders may be used without disadvantage in these hydraulic brake systems. Consequently, in addition to the advantages of the present invention, the advantages of low-drag wheel brake cylinders, such as reduced energy consumption while driving a vehicle configured with them and reduced pollutant emissions (when using a fuel as energy), may be utilized.

The above-mentioned advantages may also be effected by implementing a corresponding method for operating a hydraulic brake system of a vehicle. It is specifically emphasized, that the method for operating a hydraulic brake system of a vehicle according to the above-described specific embodiments of the control device and the hydraulic brake system, may be developed further.

Additional features and advantages of the present invention are explained below, with reference to the figures.

DETAILED DESCRIPTION

Figure 1:
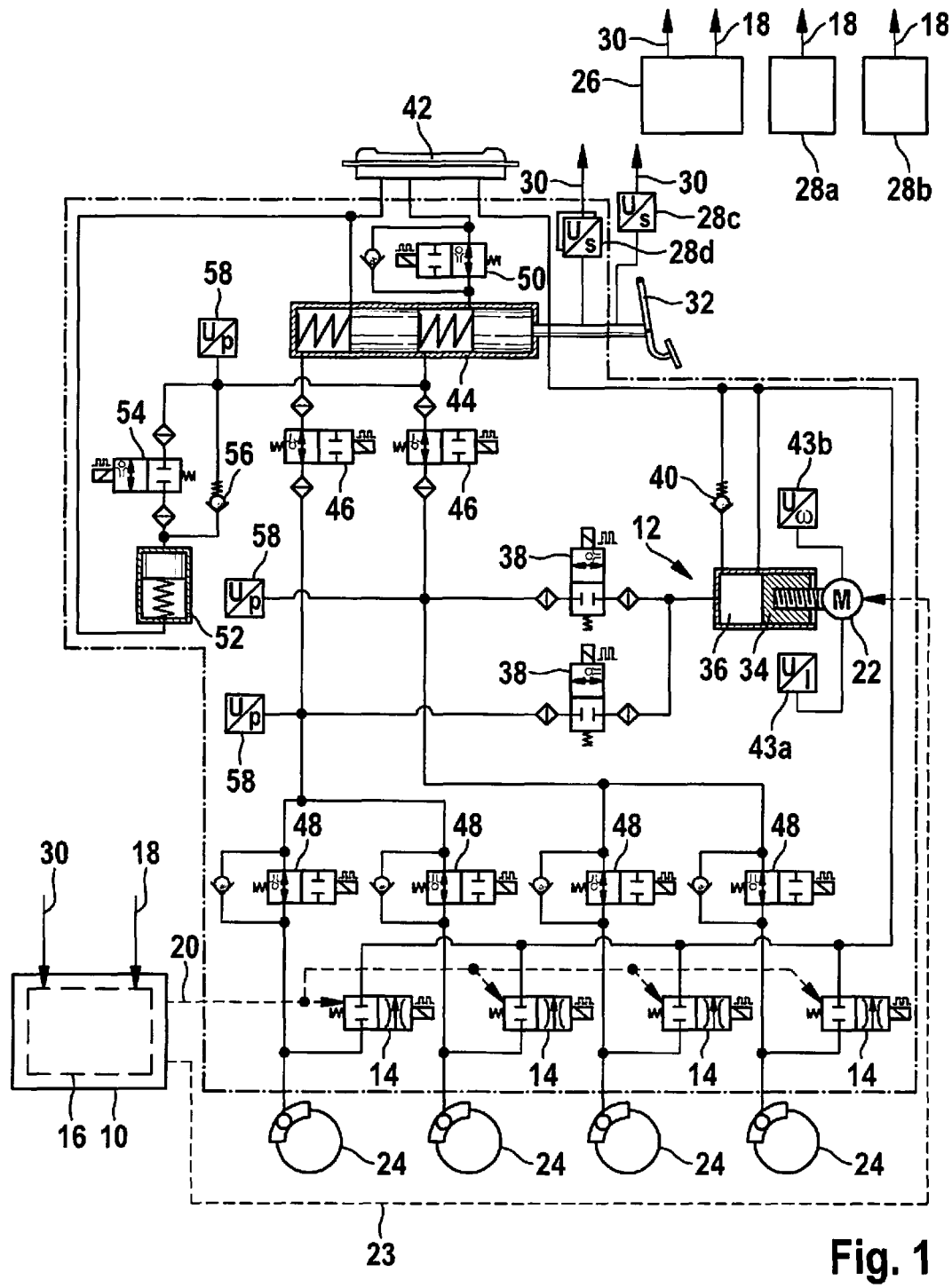
FIG. 1 shows a schematic representation of a specific embodiment of the control device and a hydraulic brake system equipped with it.

FIG. 1 shows a schematic representation of a specific embodiment of the control device and a hydraulic brake system equipped with it.

The control device 10 schematically represented in FIG. 1 is configured at least to control a motorized hydraulic device 12 and at least one wheel exhaust valve 14 of a hydraulic brake system of a vehicle/motor vehicle. Further brake system components of the specific hydraulic brake system may also be controlled with the aid of control device 10. It is also pointed out that a usability of control device 10 is limited to neither the type of brake system represented in FIG. 1, nor a particular vehicle type/motor vehicle type of the vehicle/motor vehicle equipped with it.

Control device 10 includes an electronic device 16, which is configured to force the at least one wheel exhaust valve 14 of the hydraulic brake system into an open position in an undelayed or a delayed manner (with the aid of at least one valve control signal 20), as a reaction to a supplied warning signal 18 regarding a probable, early request to brake the moving vehicle. In addition, as a reaction to supplied warning signal 18, electronic device 16 is configured to additionally activate a motor 22, which may be an electric motor, of motorized hydraulic device 12 of the hydraulic brake system (with the aid of at least one motor control signal 23) in such a manner, that by operation of activated motor 22, brake fluid may be/is conveyed to (or in the direction of) the at least one wheel exhaust valve 14, which may be open, and/or to at least one associated wheel brake cylinder 24 of the hydraulic brake system.

Supplied warning signal 18 is to be understood as a signal of an automatic speed control device 26 of the vehicle and/or of a sensor system 28a through 28d of the vehicle; with the aid of the warning signal, electronic device 16 being/being able to be informed, that soon, braking of the moving vehicle will probably be requested by automatic speed control device 26 or a driver of the vehicle, as detected by sensor system 28a through 28d. However, supplied signal 18 is not to be understood as a signal, by which control device 10 is called upon to immediately effect (actual) deceleration/braking of the vehicle. Thus, electronic device 16 is configured to prevent or limit deceleration/braking of the vehicle as a reaction to supplied warning signal 18, in that a build-up of brake pressure in the at least one wheel brake cylinder 24 is or is presently limited or prevented, by forcing the at least one wheel exhaust valve 14 into the open position (in an undelayed or a delayed manner).

Therefore, electronic device 16 brings about a "pre-braking phase" (which may be prior to actual deceleration/braking of the vehicle) as a reaction to supplied warning signal 18; in the pre-braking phase, a rotor inertia of motor 22 of motorized hydraulic device 12 being overcome by activating motor 22 (already prior to the possible, subsequent deceleration/braking of the vehicle). Using the "pre-braking" phase, it is provided that the rotor inertia of motor 22 be already overcome in the case of possible, later operation of motor 22 for effecting a requested increase, which may be an actual increase, in brake pressure in the at least one wheel brake cylinder 24. By overcoming the rotor inertia of motor 22 in the "pre-braking phase," a pressure build-up time necessary for effecting a (actual) requested increase in brake pressure may be shortened. In the same way, a demand for energy to be provided for effecting an (actual) requested increase in brake pressure may be reduced, by overcoming the rotor inertia of motor 22 in the "pre-braking phase." In this manner, a demand for energy necessary for a full brake application may even be significantly reduced.

Electronic device 16 is also configured to force the at least one wheel exhaust valve 14 into a closed state (with the aid of at least one further valve control signal 20), as a reaction to a supplied brake setpoint signal 30 of automatic speed control device 26 and/or of sensor system 28a through 28d, with regard to actual and/or requested(immediate) braking of the moving vehicle with a current setpoint deceleration not equal to zero.

Supplied brake setpoint signal 30 is to be understood as a signal, by which control device 10 is called upon to (immediately) effect (actual) deceleration/braking of the vehicle. As detected by sensor system 28a through 28d, the braking is requested by automatic speed control device 26 or by the driver of the vehicle. As of the closing of the at least one wheel exhaust valve, an increase in the brake pressure in the at least one wheel brake cylinder 24, and consequently, deceleration/braking of the vehicle with the aid of the at least one wheel brake cylinder 24, begins immediately (due to the overcoming of the rotor inertia of motor 22 already in the "pre-braking phase"). In addition, electronic device 16 is configured to control motor 22 of motorized hydraulic device 12 in accordance with the currently requested setpoint vehicle deceleration (with the aid of at least one further motor control signal 23), as a reaction to supplied brake setpoint signal 30. Due to the executed "pre-braking phase," controlled motor 22 of motorized hydraulic device 12 already rotates at a speed not equal to zero at the time of the closing of the at least one wheel exhaust valve 14. Consequently, as of the closing of the at least one wheel exhaust valve 14, the motor 22 of motorized hydraulic device 12 controlled with the aid of electronic device 16 conveys, in an undelayed manner, a volume of brake fluid corresponding to the setpoint deceleration currently requested, to the at least one wheel brake cylinder 24.

Therefore, the immediate or actually requested braking of the moving vehicle may be effected with the current setpoint deceleration (not equal to zero), within a shorter pressure build-up time/braking time, and with a reduced stopping distance of the vehicle. The specific stopping distance of the vehicle depends substantially on, how rapidly a brake pressure corresponding to the requested setpoint vehicle deceleration may be generated in the at least one wheel brake cylinder 24, using at least motorized hydraulic device 12.

This increases ride comfort and a safety standard of the vehicle equipped with control device 10.

It is emphasized that with the aid of control device 10, a pressure build-up time/braking time and a stopping distance of the vehicle equipped with it may be shortened, both in the case of carrying out autonomous braking, and in the case of carrying out driver-induced braking, which is power-assisted by motorized hydraulic device 12 (as auxiliary force braking) or achieved completely by force (as external-force braking).

In addition, motor 22 of motorized hydraulic device 12, and the hydraulic brake system, are already at a higher energy level at the time of the closing of the at least one wheel exhaust valve 14. For example, at a motor speed of 350 rad/s, a rotor energy of motor 22 corresponds to an energy level of the hydraulic brake system of 5 joules. The "boosting" of motor 22 of motorized hydraulic device 12 and of the hydraulic brake system to the higher energy level, with the aid of the "pre-braking phase," reduces a consumption of energy, which must be provided to effect the (immediate) actual and/or requested braking of the moving vehicle with the current setpoint deceleration (not equal to zero). Therefore, less energy must be provided by an energy source integral to the vehicle (such as a vehicle electrical system and/or a vehicle battery), in order to effect the (immediate) actual and/or requested braking of the moving vehicle with the current set point deceleration not equal to zero). Thus, use of the control device lowers the demands on the vehicle energy source integral to the vehicle.

Automatic speed control device 26 may be understood as, for example, an automatic system for driverless speed control/speed regulation of the vehicle and/or for autonomous driving/braking of the vehicle. Automatic speed control device 26 may be, for example, an ACC system and/or an emergency brake system of the vehicle. Automatic speed control device 26 may (at least partially) take the form of a subunit of control device 10 and/or may be formed (at least partially) separately from control device 10.

Sensor system 28a to 28d of the vehicle may be configured to supply warning signal 18 to electronic device 16, if a potential braking intent/an early request for braking appears probable, but the actual necessity/desirability of a setpoint deceleration of the vehicle not equal to zero is still to be decided. Brake setpoint signal 30 may be supplied to electronic device 16 by the sensor system 28a through 28d of the vehicle, if it is decided that a setpoint deceleration of the vehicle not equal to zero is actually necessary/desirable. Sensor system 28a through 28d of the vehicle may also (at least partially) take the form of a subunit of control device 10 and/or may be formed (at least partially) separately from control device 10. For example, sensor system 28a through 28d of the vehicle may include at least one environmental sensor 28a for monitoring (a portion of) the external surroundings of the vehicle and/or a traffic situation in (a portion of) the external surroundings of the vehicle. In particular, a distance of the vehicle to an obstacle located ahead in the direction of travel (e.g., a vehicle traveling ahead) may be ascertained with the aid of the at least one environmental sensor 28a. The at least one environmental sensor 28a may be, for example, at least one radar sensor and/or a camera image analysis system. As an alternative or addition to the at least one environmental sensor 28a, sensor system 28a through 28d of the vehicle may also include an accelerator pedal sensor 28b for supplying warning signal 18, the accelerator pedal sensor ascertaining and evaluating an accelerator pedal displacement of an accelerator pedal (not shown). For example, rapid release of the accelerator by the driver may be judged as an indicator of a probable, early request by the driver for (actual) deceleration/braking of the moving vehicle. In order to supply brake setpoint signal 30 to electronic device 16, sensor system 28a through 28d may also include at least one sensor 28c and 28d for ascertaining a manipulation of a brake pedal 32 by the driver, such as a rod travel sensor 28c and/or a differential travel sensor 28d. Consequently, a multitude of sensors often already installed in a vehicle are suitable for interacting with control device 10. In addition, the sensor types listed here for sensor system 28a through 28d of the vehicle are not to be interpreted as exclusive.

In the specific embodiment of FIG. 1, with the aid of control device 10, a motor 22 of a piston-cylinder device 12, in the form of a motor 22 of motorized hydraulic device 12, may be activated as a reaction to supplied warning signal 18 and controlled as a reaction to supplied brake setpoint signal 30, in accordance with the requested setpoint deceleration. By operation of motor 22, a piston 34 of motorized piston-cylinder device 12 is linearly adjustable in such a manner, that a storage volume 36, fillable with brake fluid, of motorized piston-cylinder device 12 is reducible/reduced, and brake fluid forced out of storage volume 36 is conveyed/conveyable in the direction of the at least one wheel exhaust valve 14 and/or the at least one wheel brake cylinder 24. Merely by way of example, motorized piston-cylinder device 12 is connected to the at least one wheel brake cylinder 24 (and to the at least one wheel exhaust valve 14) via at least one first separating valve 38. In addition, storage volume 36 is hydraulically connected to a brake fluid reservoir 42 of the hydraulic brake system via an expansion bore and via a further bore equipped with a pressure relief valve 40. A design of motorized piston-cylinder device 12 including a motor current sensor 43a and a speed sensor 43b is also to be interpreted as merely illustrative.

As an alternative, or in addition to the above-described control of motor 22 of piston-cylinder device 12 by control device 10, with the aid of control device 10, a motor of at least one pump, in the form of a (further) motor 22 of motorized hydraulic device 12, may also be activated as a reaction to supplied warning signal 18 and controlled as a reaction to supplied brake setpoint signal 30, in accordance with the setpoint deceleration currently requested. In this context, a usability of control device 10 is not limited to a particular pump type of the at least one pump.

As an advantageous further refinement, electronic device 16 may even be configured to force the at least one wheel exhaust valve 14 into the open position, in a delayed manner, with a delay time (not equal to zero), as a reaction to supplied warning signal 18. The delay time elapsing prior to the opening of the at least one wheel exhaust valve 14 may be a fixedly predefined delay time. Alternatively, the delay time (in the form of "delay time elapsed") may be allowed to elapse/may elapse until the reaching of a fixedly predefined, limiting brake pressure in the at least one wheel brake cylinder 24 or until the reaching of a brake pressure necessary to close an air gap of the at least one wheel brake cylinder 24.

Consequently, in the "pre-braking phase," electronic device 16 may also be used for a "minimum brake pressure build-up" (for precharging the at least one wheel brake cylinder 24) or for "overcoming an air gap." Therefore, a rapid response time of the hydraulic brake system is even ensured in the case of equipping the hydraulic brake system with, in each instance, a low-drag wheel brake cylinder (low drag caliper) as the at least one wheel brake cylinder 24.

In the specific embodiment of FIG. 1, the at least one wheel brake cylinder 24 is hydraulically connected to brake fluid reservoir 42 of the hydraulic brake system via the at least one associated wheel exhaust valve 14. However, as an alternative, the at least one wheel brake cylinder 24 may also be connected to a low-pressure storage chamber via the at least one wheel exhaust valve 14. In this case, it is advantageous for an operating pressure of the low-pressure storage chamber to be greater than or equal to a brake pressure necessary to close an air gap of the at least one wheel brake cylinder 24. Thus, the hydraulic brake system configured with control device 10 may also be structurally implemented for "automatically overcoming an air gap" in the "pre-braking phase." In this case, a design of control device 10 to allow a delay time sufficient for closing the air gap of the at least one wheel brake cylinder 24 to elapse may be dispensed with, without disadvantage.

In the hydraulic brake system of FIG. 1, brake pedal 32 is linked to a master brake cylinder 44, which is connected to the at least one wheel brake cylinder 24 via at least one second separating valve 46. In addition, the hydraulic brake system even includes at least one (optional) wheel intake valve 48 (with a check valve positioned in parallel with it), via which the at least one first separating valve 38 and the at least one second separating valve 46 are connected to the at least one wheel brake cylinder 24. A hydraulic connection of master brake cylinder 44 to brake fluid reservoir 42 via a further separating valve 50 (having a check valve positioned in parallel with it) is only to be interpreted as illustrative. In the same manner, a connection of a pedal displacement simulator 52 to master brake cylinder 44 via a simulator separating valve 54 and a pressure relief valve 56 positioned in parallel with it may also be dispensed with. Furthermore, the equipping of the brake system with at least one pressure sensor 58 is also to be interpreted as optional.

FIG. 2a through 2h show coordinate systems for explaining a specific embodiment of the method for operating a hydraulic brake system of a vehicle.

The hydraulic brake system explained above may be operated, for example, using the method described in the following. However, it should be pointed out that an ability to implement the method described here is not limited to this type of brake system.

In the method described here, at a time to, it is/appears probable that braking (that is, deceleration/braking) of the moving vehicle will soon be requested by a speed control device of the vehicle or by a driver of the vehicle. Options for detecting such a situation are already described above. For example, at time t0, a sensor system of the vehicle detects a pedestrian on a roadway, in front of the vehicle in the direction of travel.

At time t0, at least one wheel exhaust valve of the hydraulic brake system is forced, undelayed or delayed, into an open state. In addition, at time t0, a motor of a motorized hydraulic device of the hydraulic brake system is activated in such a manner, that brake fluid is conveyed to the at least one wheel exhaust valve and/or at least one wheel brake cylinder of the hydraulic brake system by operation of the activated motor.

Figure 2A:
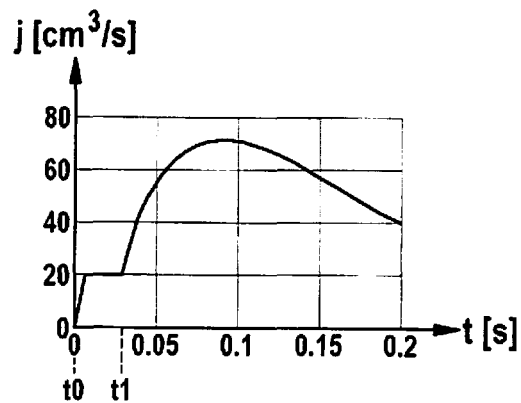
FIGS. 2a, 2b, 2c, 2d, 2e, 2f, 2g and 2h shows coordinate systems for explaining a specific embodiment of the method for operating a hydraulic brake system of a vehicle.
Figure 2B:
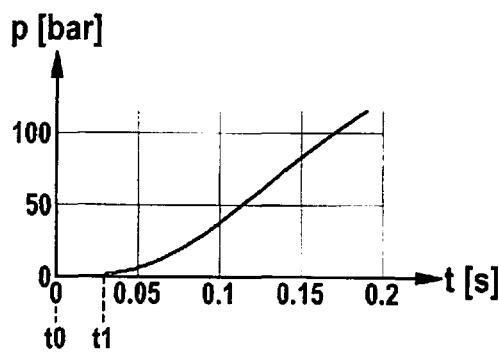
Figure 2C:
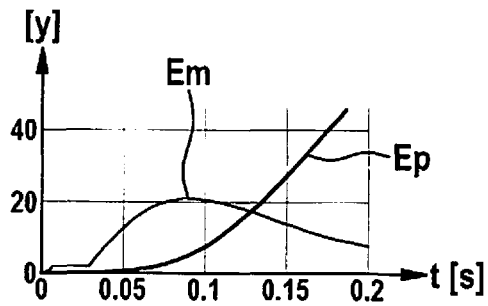
Figure 2D:
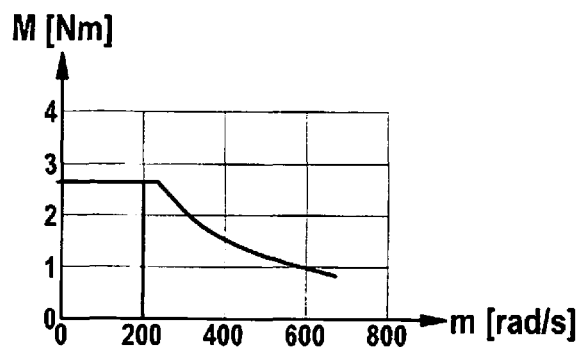

In the coordinate systems of FIG. 2a through 2c, each of the abscissas is a time axis t (in seconds). A volumetric flow rate j (in cubic centimeters/second) conveyed by the motor of the motorized hydraulic device, a brake pressure p in the at least one wheel brake cylinder (in bars), an energy level Em of the motor of the motorized hydraulic device (in joules), and an "energy level present in the at least one wheel brake cylinder" Ep (in joules) are represented by the ordinates of the coordinate systems of FIG. 2a through 2c. As of time t0, it is apparent that the motor of the motorized hydraulic device has a motor speed not equal to zero. However, due to the (undelayed) opening of the at least one wheel exhaust valve at time t0, brake pressure p in the at least one wheel brake cylinder still remains (nearly) equal to atmospheric pressure. However, energy level Em of the motor of the motorized hydraulic device is already "pre-increased" as of time t0.

At a time t1, the braking of the moving vehicle with a current setpoint deceleration not equal to zero is (actually) requested. For example, the driver of the vehicle steps on the brake pedal at time t1, since one has noticed the pedestrian in front of his/her vehicle. Therefore, as of time t1, the at least one wheel exhaust valve is forced into a closed position. At time t1, as well, the (already) activated motor is controlled in accordance with the current setpoint deceleration. To that end, for example, a motor speed of the motor of the motorized hydraulic device is increased from 200 revolutions/second to 600 revolutions/second. A relation between motor speed m (in revolutions/second) and a motor torque M (in newton meters) is represented with the aid of the coordinate system of FIG. 2d.

Since energy level Em of the motor of the motorized hydraulic device is already "pre-increased" at time t1, the vehicle may be brought to a dead stop more rapidly. (The motor energy level Em "pre-increased" at time t1 reduces a braking time and a stopping distance of the vehicle considerably.) In addition, as of time t1, a power output of an energy source integral to the vehicle may be used exclusively for dynamically building up pressure in the at least one wheel brake cylinder or for further accelerating the motor. Consequently, the method described here also allows effective pedestrian safety.

As an alternative to the undelayed opening of the at least one wheel exhaust valve at time t0, if it is/appears probable that braking of the moving vehicle will soon be called for by the speed control device or the driver, the at least one wheel exhaust valve may also be forced into the open position, delayed by a fixedly predefined delay time (not equal to zero). In the same way, if it is/appears probable that braking of the moving vehicle will soon be requested by the speed control device or by the driver, the at least one wheel exhaust valve may be forced into the open position, delayed by a delay time elapsing until the reaching of a fixedly predefined, limiting brake pressure in the at least one wheel brake cylinder, or the reaching of a brake pressure necessary for closing an air gap of the at least one wheel brake cylinder. Thus, there is a choice of executing the method without precharging the at least one wheel brake cylinder in the "pre-braking phase," or with the precharging of the at least one wheel brake cylinder in the "pre-braking phase" (e.g., for "overcoming the air gap").

By opening the at least one wheel exhaust valve, then, for both cases (no precharging of the at least one wheel brake cylinder in the "pre-braking phase" or precharging of the at least one wheel brake cylinder in the "pre-braking phase"), it is ensured that the motor may rotate in a "charging phase" without a disturbing build-up of pressure/an unwanted deceleration of the vehicle. A volume displaced by the motor is discharged through the at least one wheel exhaust valve (e.g., into a brake fluid reservoir or into a low-pressure storage chamber). As soon as the at least one wheel exhaust valve is closed, energy stored in the power train (in the form of rotary energy of a rotor of the motor) is completely available for building up pressure.

Figure 2E:
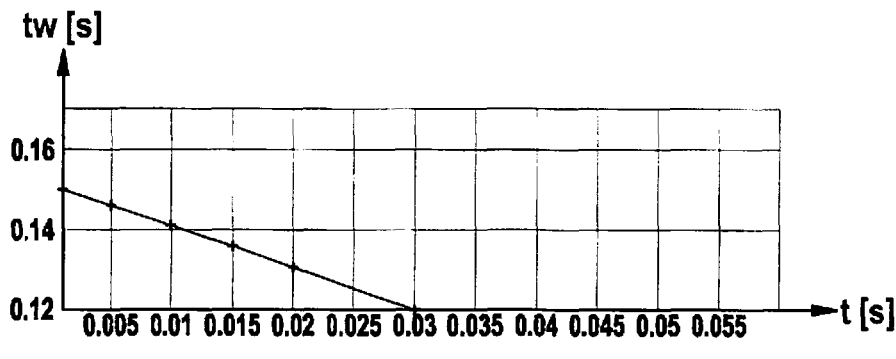
Figure 2F:
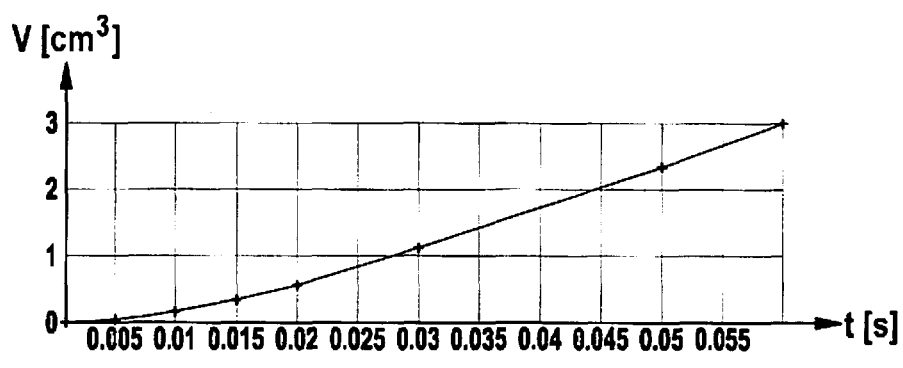
Figure 2G:
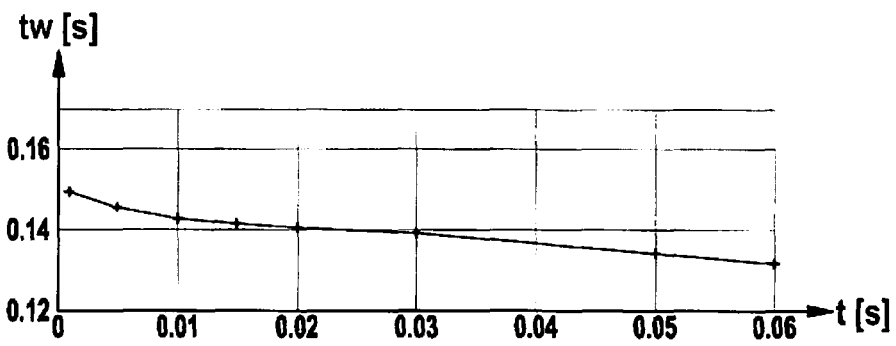
Figure 2H:
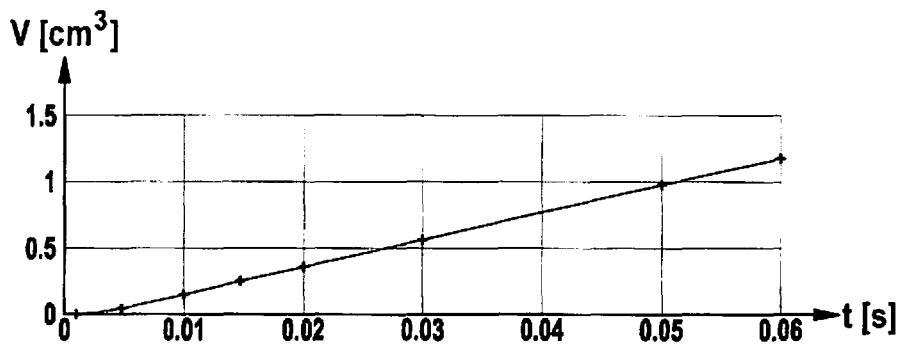

In the coordinate systems of FIG. 2e through 2h, each of the abscissas is time axis t (in seconds). In the example of FIGS. 2e and 2f, the motor of the motorized hydraulic device is operated in the "pre-braking phase," at a motor speed m of 600 revolutions/second. An example including operation of the motor of the motorized hydraulic device in the "pre-braking phase," at a motor speed m of 200 revolutions/second, is represented by FIGS. 2g and 2h. In each instance, after executing the "pre-braking phase" for time t, an ordinate of the coordinate systems of FIGS. 2e and 2g indicates the waiting time tw (in seconds), which is still necessary to reach a requested setpoint brake pressure in the at least one wheel brake cylinder. It is apparent that (in the example of 600 revolutions/second in the "pre-braking phase") after a "pre-braking phase" of 30 milliseconds, only 120 milliseconds are still needed to reach the requested setpoint brake pressure in the at least one wheel brake cylinder. A volume V (in cubic centimeters) of brake fluid transferred though the at least one wheel exhaust valve during the "pre-braking phase" is indicated by the specific ordinate of the coordinate systems of FIGS. 2f and 2h.

What is claimed is:

1. A control device for a hydraulic brake system of a vehicle, comprising:
an electronic device, wherein, as a reaction to a supplied warning signal of an automatic speed control device of the vehicle and/or of a sensor system of the vehicle as to a probable, early request for braking of the moving vehicle by the automatic speed control device or by a driver of the vehicle, is configured to force at least one wheel exhaust valve of the hydraulic brake system, undelayed or delayed, into an open position and to activate a motor of a motorized hydraulic device of the hydraulic brake system so that brake fluid is conveyable to the at least one wheel exhaust valve and/or to at least one associated wheel brake cylinder by operation of the activated motor;
wherein the electronic device is configured, as a reaction to a supplied brake setpoint signal of the automatic speed control device and/or of the sensor system, as to requested braking of the moving vehicle, with a current setpoint deceleration not equal to zero, to force the at least one wheel exhaust valve into a closed position and to control the motor of the motorized hydraulic device according to the setpoint deceleration currently requested.

2. The control device of claim 1, wherein the electronic device is configured, as a reaction to the supplied warning signal, to force the at least one wheel exhaust valve into the open position, delayed by a fixedly predefined, elapsed delay time or a delay time elapsed until the reaching of a brake pressure necessary to close an air gap of the at least one wheel brake cylinder.

3. The control device of claim 1, wherein with the control device, a motor of a piston-cylinder device, in the form of a motor of the motorized hydraulic device, is activatable as a reaction to the supplied warning signal and controllable as a reaction to the supplied brake setpoint signal, in accordance with the setpoint deceleration currently requested.

4. The control device of claim 1, wherein with the control device, a motor of at least one pump, in the form of a motor of the motorized hydraulic device, is activatable as a reaction to the supplied warning signal and controllable as a reaction to the supplied brake setpoint signal, in accordance with the setpoint deceleration currently requested.

5. A hydraulic brake system for a vehicle, comprising:
a control device for a hydraulic brake system of a vehicle, including:
an electronic device, wherein, as a reaction to a supplied warning signal of an automatic speed control device of the vehicle and/or of a sensor system of the vehicle as to a probable, early request for braking of the moving vehicle by the automatic speed control device or by a driver of the vehicle, is configured to force at least one wheel exhaust valve of the hydraulic brake system, undelayed or delayed, into an open position and to activate a motor of a motorized hydraulic device of the hydraulic brake system so that brake fluid is conveyable to the at least one wheel exhaust valve and/or to at least one associated wheel brake cylinder by operation of the activated motor,
wherein the electronic device is configured, as a reaction to a supplied brake setpoint signal of the automatic speed control device and/or of the sensor system, as to requested braking of the moving vehicle, with a current setpoint deceleration not equal to zero, to force the at least one wheel exhaust valve into a closed position and to control the motor of the motorized hydraulic device according to the setpoint deceleration currently requested;
the motorized hydraulic device;
the at least one wheel brake cylinder; and
the at least one wheel exhaust valve.

6. The hydraulic brake system of claim 5, wherein the at least one wheel brake cylinder is connected to a low-pressure storage chamber via the at least one wheel exhaust valve, and wherein an operating pressure of the low-pressure storage chamber is greater than or equal to a brake pressure necessary to close an air gap of the at least one wheel brake cylinder.

7. The hydraulic brake system of claim 5, wherein in each instance, the at least one wheel brake cylinder is a low-drag wheel brake cylinder.

8. A method for operating a hydraulic brake system of a vehicle, the method comprising:
forcing, if it is probable that braking of the moving vehicle will soon be requested by a speed control device of the vehicle or by a driver of the vehicle, at least one wheel exhaust valve of the hydraulic brake system into an open position in an undelayed or a delayed manner, and activating a motor of a motorized hydraulic device of the hydraulic brake system so that brake fluid is conveyed to the at least one wheel exhaust valve and/or to at least one wheel brake cylinder of the hydraulic brake system, by operation of the activated motor; and
forcing, as soon as the braking of the moving vehicle at a current setpoint deceleration not equal to zero is requested, the at least one wheel exhaust valve into a closed position and controlling the activated motor according to the current setpoint deceleration.

9. The method of claim 8, wherein if it is probable that braking of the moving vehicle will soon be requested by the speed control device or by the driver, the at least one wheel exhaust valve is forced into the open position, delayed by a fixedly predefined delay time.

10. The method of claim 8, wherein if it is probable that braking of the moving vehicle will soon be requested by the speed control device or by the driver, the at least one wheel exhaust valve is forced into the open position, delayed by a delay time elapsing until the reaching of a fixedly predefined, limiting brake pressure in the at least one wheel brake cylinder, or until the reaching of a brake pressure necessary for closing an air gap of the at least one wheel brake cylinder.

\* \* \* \* \*